(12) United States Patent
Kulkarni et al.

(10) Patent No.: US 8,493,844 B2
(45) Date of Patent: Jul. 23, 2013

(54) METHOD FOR THE RECONFIGURATION OF A COMMUNICATIONS NETWORK

(75) Inventors: Vivek Kulkarni, Unterhaching (DE); Martin Nathansen, München (DE); Elie Sfeir, München (DE)

(73) Assignee: Siemens Aktiengesellschaft, München (DE)

( * ) Notice: Subject to any disclaimer, the term of this patent is extended or adjusted under 35 U.S.C. 154(b) by 618 days.

(21) Appl. No.: 12/593,692

(22) PCT Filed: Mar. 12, 2008

(86) PCT No.: PCT/EP2008/052896
§ 371 (c)(1),
(2), (4) Date: Sep. 29, 2009

(87) PCT Pub. No.: WO2008/119626
PCT Pub. Date: Oct. 9, 2008

(65) Prior Publication Data
US 2010/0128603 A1    May 27, 2010

(30) Foreign Application Priority Data
Mar. 30, 2007   (DE) .......................... 10 2007 015 449

(51) Int. Cl.
*G01R 31/00* (2006.01)

(52) U.S. Cl.
USPC .......................................... 370/228; 370/242

(58) Field of Classification Search
USPC ................. 370/216–220, 228, 244, 245, 250, 370/252, 254, 437, 443
See application file for complete search history.

(56) References Cited

U.S. PATENT DOCUMENTS
6,032,194 A      2/2000  Gai et al.
6,222,855 B1 *  4/2001  Kimber et al. ................. 370/466

(Continued)

FOREIGN PATENT DOCUMENTS
DE    102005017021 A1    10/2006
WO    WO 03/024029 A2    3/2003

OTHER PUBLICATIONS

Standard IEEE 802.1w; IEEE Standard for Local and metropolitan area networks—Common Specifications; Part 3: Media Access Control (MAC) Bridges—Amendment 2: Rapid Reconfiguration; 2001; pp. i-viii; 1-108; The Institute of Electrical and Electronics Engineers, Inc. New York, NY.
Kai Hansen; "Redundancy Ethernet in industrial automation"; 10th IEEE International Conference on Emerging Technologies and Factory Automation, Sep. 22, 2005; pp. 941-947; XP-002495535.
Cisco Systems; "Spanning Tree Protocol: Understanding Rapid Spanning Tree Protocol (802.1w);" Internet Citation, [Online] Apr. 2, 2005; pp. 1-10; Internet: URL:http://www.cisco.com/en/US/tech/tk389/tk621/technologies_white_paper09186a0080094cfa.shtml> (gefunden am Sep. 26, 2005); XP-002346572.

*Primary Examiner* — Donald Mills
*Assistant Examiner* — Mon Cheri Davenport

(57) ABSTRACT

A method for reconfiguring a communication network is provided. A first network uses a first network protocol and a second network uses a second network protocol, the two networks being connected by two data links. A first data link is initialized as activated and a second data link is initialized as deactivated. A failure of the first data link is detected by a first bridge of the second network, the first bridge being connected to the first data link. A first data packet is generated by the first bridge and is transmitted to a second bridge of the second network, the second bridge being connected to the second data link. The first data packet is received and processed by the second bridge. The first data packet contains information which initiates a partial implementation of the first network protocol on a port of the second bridge and an activation of the second data link.

18 Claims, 3 Drawing Sheets

U.S. PATENT DOCUMENTS 7,177,946 B1 2/2007 Kaluve et al.
2003/0016624 A1* 1/2003 Bare ............................ 370/217
2003/0208618 A1* 11/2003 Mor et al. ..................... 709/238
2008/0043622 A1* 2/2008 Kamath et al. ................ 370/235
2008/0279096 A1* 11/2008 Sullivan et al. ............... 370/221

* cited by examiner

METHOD FOR THE RECONFIGURATION OF A COMMUNICATIONS NETWORK

CROSS REFERENCE TO RELATED APPLICATIONS

This application is the US National Stage of International Application No. PCT/EP2008/052896 filed Mar. 12, 2008, and claims the benefit thereof. The International Application claims the benefits of German Patent Application No. 10 2007 015 449.8 DE filed Mar. 30, 2007; both of the applications are incorporated by reference herein in their entirety.

FIELD OF INVENTION

The invention is in the technical area of packet-switched communications networks and relates to a method for the reconfiguration of a communications network, in which LANs which employ different network protocols are connected to each other.

BACKGROUND OF INVENTION

Packet-switched Ethernet networks (LAN=Local Area Network) are employed both in the industrial and the office environment, where the demands placed on networks are very different. In contrast to the office environment, LANs in day-to-day industrial applications must operate reliably under extreme conditions, such as electromagnetic noise fields, high operating temperatures and mechanical stresses. As the failure of a production plant and the associated downtimes are as a rule bound up with high costs, it is also the case that in industrial applications, failsafe requirements are more exacting than in the office environment.

For this reason, industrial LANs generally employ robust components that enable high-speed redundancy mechanisms, thereby minimizing costs in the event of a fault. In addition a ring topology is usually selected for the network, as this enables a rapid reconfiguration time of less than 500 ms in the case of the failure of a data link or a bridge. Ethernet standard-based standard or proprietary network protocols are generally employed as network protocols for industrial LANs.

By contrast, LANs in office environments are mostly of star-shaped or mesh-type topology and nowadays as a rule employ RSTP (RSTP=Rapid Spanning Tree Protocol) according to IEEE Standard 802.1w as their network protocol.

SUMMARY OF INVENTION

In practical application, ring-shaped industrial LANs are connected together with mesh-type office LANs via data links. In order to enhance the failsafe characteristics of networks connected in this way, it is known that two redundant data links are set up between the two networks, of which only a first redundant data link is activated for data exchange between the two networks, while the second redundant data link is blocked and activated as a backup data link instead of the activated first data link only in the event of a malfunction. It is a disadvantage here that the switchover procedure for activation of the blocked second data link takes a comparatively long time, lasting approximately 30 second when RSTP standardized routines are used in the office LAN.

For this reason it would be desirable to have available a method for the reconfiguration of a communications network connecting an office LAN and an industrial LAN, which enables faster reconfiguration upon failure of one of the two data links connecting the LAN compared with the traditional method.

This object is achieved by a method for the reconfiguration of a packet-switched communications network as claimed in the independent claim. Advantageous embodiments are specified by the features of the dependent claims.

A method for the reconfiguration of a packet-switched communications network is shown which comprises a (bridge-switched) first network and a (bridge-switched) second network, which are connected together by means of two redundant data links, of which in each case only one is activated for the exchange of useful data. Here and hereinafter, the data links connecting the two networks are designated "redundant data links". The network nodes of the communications network are here designated "bridges". Within the meaning of the invention switches (switches=multiport bridges) or other network nodes suitable for switching purposes can nevertheless also be involved.

The two redundant data links comprise one presettable activatable or activated first redundant data link employed for the exchange of useful data and one presettable inactivatable or inactivated second redundant data link, which can also be used for the exchange of useful data upon failure of the first redundant data link.

The two redundant data links in each case connect a bridge of the first network and a bridge of the second network together by data technology means. Each bridge of the second network can hereby be connected in each case with a separate bridge of the first network. It is equally well possible for a number of bridges of the second network to be connected to different ports of the same bridge of the first network or that a number of bridges of the first network to be connected to different ports of the same bridge of the second network.

The bridge of the second network connected to the first redundant data link is here and hereinafter designated "first bridge". The bridge of the second network connected to the second redundant data link is here and hereinafter designated "second bridge".

The first network of the communications network can in particular be installed as an office LAN in an office environment. A first network protocol for the data exchange is set up for the first network. RSTP according to IEEE Standard 802.1w is preferably employed as the first network protocol in the first network, which embodies a logical topology in the form of a spanning tree on the physical topology of the first network. The first network preferably has a mesh-type or star-shaped physical topology.

The second network of the communications network can in particular be installed as an industrial LAN in an industrial environment, and employs a second network protocol in particular based on the Ethernet standard for data exchange, which can be a standard or proprietary network protocol. The network protocol of the second network is different from the first network protocol, in particular RSTP. The second network preferably has a ring-shaped topology.

The inventive method for the reconfiguration of the communications network comprises the following steps:

Detection of a failure of the (initialized) activated first redundant data link by the first bridge of the second network connected to the first redundant data link. The failure of the first redundant data link can, for example, be detected by a non-receipt of a signal transmitted from the bridge of the first network connected to the first redundant data link by means of the first bridge ("loss-of-signal"). For this purpose the first bridge is provided with a device for the detection of a loss of signal (hardware-detector). A so-called hardware-alarm of the first bridge can be initiated hereby.

After detection of the failure of the first redundant data link by the first bridge: generation of a first data packet (N1) by the first bridge and transmission of the first data packet (N1) to the second bridge of the second network connected to the second redundant data link. The first data packet (N1) is advantageously transmitted from the first bridge of the second network to the second bridge of the second network by means of the second network protocol.

Subsequently reception and processing of the first data packet by the second bridge, where the first data packet contains logical information, by means of which the at least partial execution of the first network protocol, in particular RSTP, is initiated on a port of the second bridge connected to the second redundant data link.

Activation of the second redundant data link by means of the first network protocol, in particular RSTP, executed on the port of the second bridge. Activation of the second redundant data link preferably takes place by means of execution of a handshake mechanism defined in RSTP between the RSTP port of the second bridge of the second network connected to the inactivated second redundant data link and a bridge of the first network connected to the inactivated second redundant data link. An activation of the inactivated second redundant data link here takes place by means of routines standardized in RSTP.

By means of the inventive method a more rapid reconfiguration of a logical topology than with conventional methods can be achieved upon failure of one of the redundant data links connecting the two LANs.

In an advantageous embodiment of the inventive method this comprises the following further steps:

Detection of the restoration of the failed first redundant data link by the first bridge of the second network. The detection takes place for example by means of a reinstating reception of signals, like an RSTP configuration framework by the first bridge (hardware-detector) of the second network.

After detection of the restoration of the first redundant data link: generation of a second data packet (N2) by the first bridge and transmission of the second data packet to the second bridge of the second network of the previously activated second redundant data link. The second bridge is hereby informed of the restoration of the first redundant data link.

Reception and processing of the second data packet by the second bridge, where the second data packet contains logical information, by means of which an at least partial termination of the execution of RSTP on the RSTP port of the second bridge of the second network connected to the second redundant data link is brought about. Alternatively a termination of the transmission of RSTP configuration frameworks (hello-signals) can also be effected, by means of the second bridge via the activated redundant second data link.

An activation of the restored first redundant data link and inactivation of the activated second redundant data link subsequently take place.

A rapid reconfiguration of a logical topology can hereby be achieved in an advantageous manner upon restoration of the first redundant data link.

For activation of the first redundant data link and for inactivation of the second redundant data link the inventive method advantageously comprises the steps after detection of the restoration of the failed first redundant data link by the first bridge:

At least partial execution of the first network protocol, in particular RSTP, on a port of the first bridge connected to the first redundant data link. In the case of RSTP activation of the first redundant data link preferably takes place by means of execution of a handshake mechanism defined in RSTP between the RSTP port of the first bridge of the second network connected to the inactivated first redundant data link and a bridge of the first network connected to the inactivated first redundant data link. An activation of the inactivated first redundant data link here takes place by means of routines standardized in RSTP. Forwarding of an RSTP configuration framework generated during the handshake mechanism to the bridge of the first network connected to the second redundant data link by the first bridge also takes place for inactivation of the second redundant data link. An inactivation of the activated second redundant data link here takes place by means of routines standardized in RSTP.

Termination of the execution of the first network protocol, in particular RSTP, on the port of the first bridge connected to the first redundant data link.

A particularly rapid reconfiguration of a logical topology can hereby be achieved in an advantageous manner upon restoration of the first redundant data link.

The invention further extends to a packet-switched communications network as described above with a first network employing a first network protocol and a second network employing a second network protocol which differs from the first network protocol, in which the two networks are connected together by means of two redundant data links, of which in each case only one is activated for exchange of useful data. In the communications network the bridges, in particular the bridges of the second network connected to a redundant data link, are in each case set up in such a way that a method such as that described above can be executed.

The invention further extends to a bridge of a packet-switched communications network such as that described above.

BRIEF DESCRIPTION OF THE DRAWINGS

The invention is now explained in greater detail on the basis of an exemplary embodiment, where reference is made to the attached drawing, wherein.

DETAILED DESCRIPTION OF INVENTION

Figure 1A:
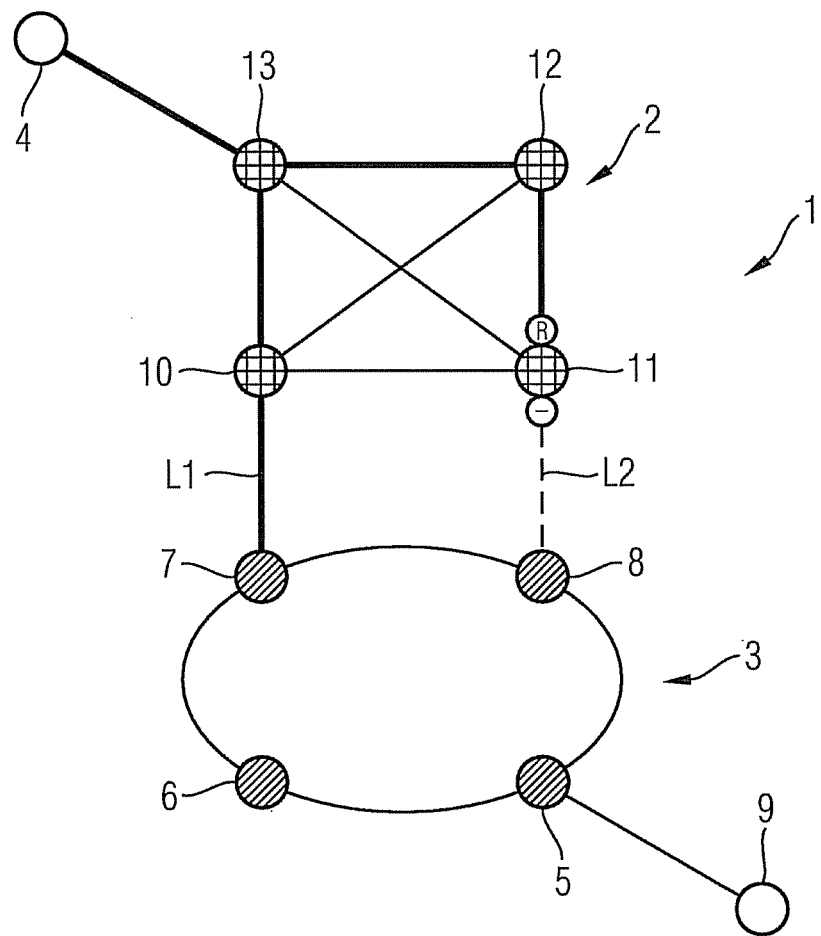
FIG. 1A-1C shows a diagrammatic representation to illustrate an exemplary embodiment of the inventive method for the reconfiguration of a communications network.
Figure 1B:
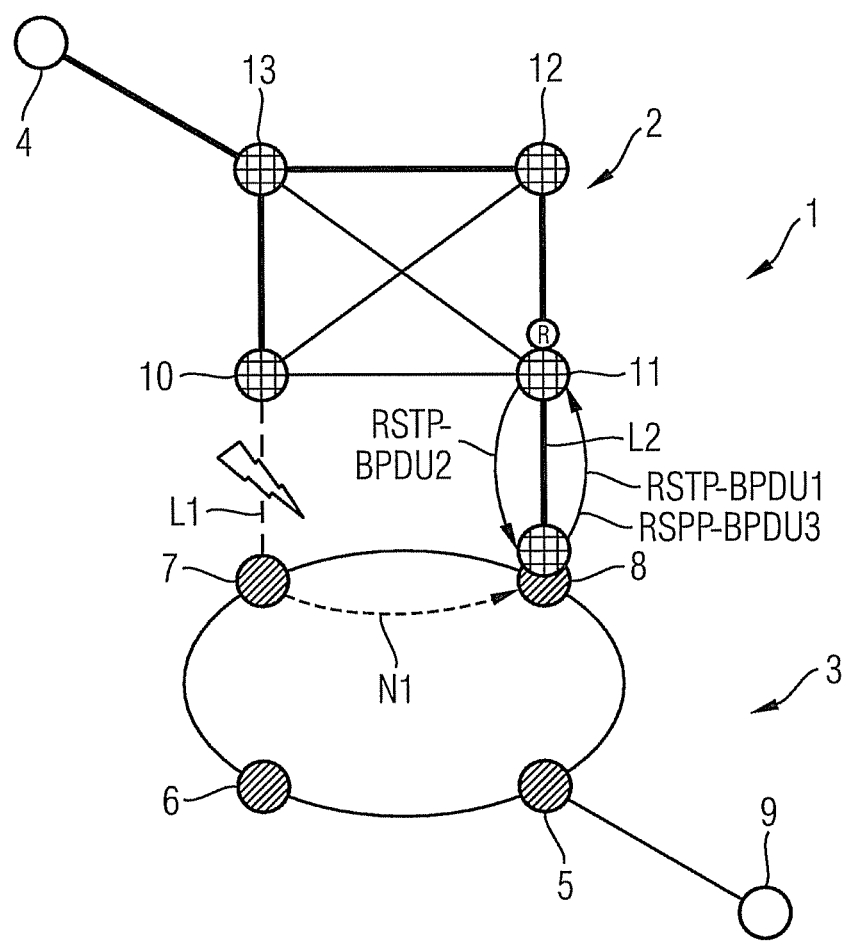
Figure 1C:
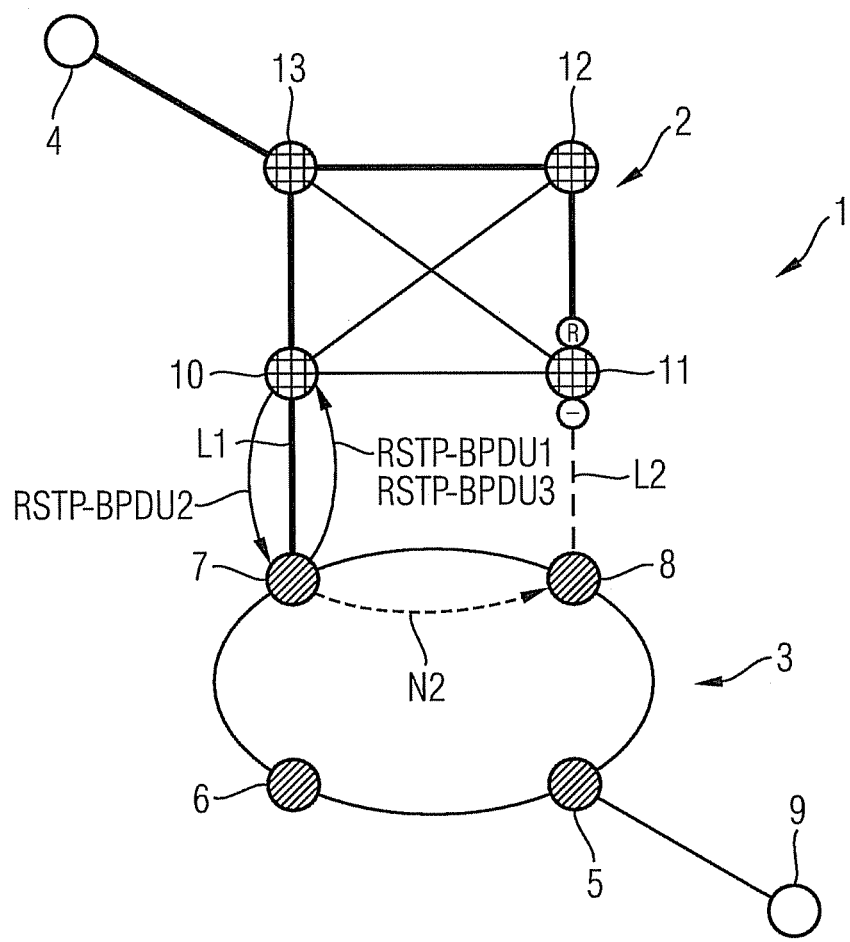

FIG. 1A-1C shows in diagrammatic form an exemplary embodiment of the inventive communications network. The communications network identified as a whole by the reference number 1 comprises a mesh-type office LAN 2 installed in an office environment, and a ring-shaped industrial LAN 3 installed in an industrial environment.

The physical topology of the office LAN 2 comprises four RSTP bridges 10, 11, 12, 13, which are networked together in each case via point-to-point connection lines (data links) in a mesh-type arrangement. In the figures the data links are represented by solid lines and are otherwise not further identified. A subscriber 4 (transmitter/receiver) which is connected to the office LAN 2 via a data link with one of the bridges, here bridge 13, is merely represented by way of example.

The office LAN 2 employs the network protocol RSTP standardized according to IEEE Standard 802.1w. RSTP embodies a logical topology in the form of a spanning tree on the physical topology of the office LAN 2 specified by the data links, which is used exclusively for the exchange of useful data. In the figures the data links belonging to the spanning free are indicated by thicker lines. The data links not belonging to the spanning tree are blocked for the exchange of useful data, but can be activated.

RSTP assigns unique identifiers (IDs) and path costs to all bridges and ports of the office LAN 2. In RSTP the bridges comprise the logical topology of the network by means of the data packets (data framework) passing through it autonomously, by making use of the layer-2 addresses of the network (MAC addresses, MAC=Medium Access Control) of the bridges.

The ports of the bridges may assume different statuses, in particular a "Blocking" status, in which only configuration frameworks, so-called BPDUs (BPDU=Bridge Protocol Data Unit), are accepted by the bridges, a "Listening" status, during which the active logical topology is formed in the form of a spanning tree, a "Learning" status, during which a bridging-table is put together from the MAC addresses which have been read, a "Forwarding" status, in which the ports forward BPDUs and useful data, and a "Disabled" status, in which ports neither receive nor forward useful data or BPDUs. With the aid of the information contained in the BPDUs, the bridges can change the statuses of their ports.

Each BPDU contains a series of fields, such as a flag field for the display or confirmation of a topology change, a root bridge ID field for identification of the root bridge, specifying priority and ID, a path costs field for specifying the path costs of the root bridge transmitting the BPDU, a message age field (MessAge) to specify the period since transmission of the BPDU, a MaxAge field for specifying a period after the expiration of which the message is to be deleted, a hello-time field to specify the interval between regular configuration messages (hello signals) from the root bridge, and a forward delay field, which gives the delay after a change of topology.

In order to form a loop-free logical topology, four criteria are used in STP for determining the highest priorities of the bridges or their ports. These are: the smallest root bridge ID, the lowest path costs to the root bridge, the smallest transmit bridge ID and the smallest port ID.

In order to determine a root bridge, all ports of the bridges in RSTP initially take on the status "Blocking" after the initialization (for example after network restart), where each bridge assumes that it is itself a root bridge and sends a corresponding BPDU to the other bridges with its own ID as root bridge ID. The bridge with the lowest root bridge ID is then selected as root bridge. In the case of identical root bridge IDs, the lowest MAC address is applied as a supplementary criterion.

From the selected root bridge, all network paths of the spanning tree are then defined via which data exchange between the bridges in the office LAN 2 is to take place. To this end the root bridge initially transmits BPDUs to the other bridges. Each bridge then designates as the root port a port having the lowest path costs to the root bridge. In the case of identical path costs, the port ID is taken as a supplementary criterion. Designate-ports are then determined on the basis of the path costs and the designated bridges of the spanning tree also determined.

In RSTP, the root bridge informs all bridges in the spanning tree at regular intervals that it is still there, by means of a BPDU (hello-signal). If no such hello-signal is forthcoming, possibly due to the failure of a link or of the root bridge itself, a reconfiguration (reconvergence) of the communications network is required to determine a new spanning tree. As during this time only BPDUs, that is data packets for the determination of a new spanning tree, are transmitted, the network cannot be used for an exchange of useful data during this period.

In RSTP, alternative ports are additionally determined that block BPDUs from other bridges and offer an alternative path to the root bridge if the root port fails.

Furthermore in RSTP a proposal/agreement handshake mechanism is implemented between directly connected bridges. By way of the proposal/agreement handshake mechanism, RSTP bridges directly connected via a data link transmit BPDUs to the neighboring bridges at prescribed intervals. In RSTP it is stipulated that a bridge loses its link to a neighboring bridge if it cannot receive a plurality of BPDUs within a prescribed period. Failure of a data link can be rapidly detected in this way.

The topology of the industrial LAN 3 comprises four bridges 5, 6, 7, 8, which are connected to one another via the respective point-to-point data links in a ring-shaped configuration. In the figures the data links between the bridges are represented by means of a solid line and are not otherwise designated in greater detail. A subscriber 9 (transmitter/receiver), which is connected to one of the bridges, here bridge 5, is merely represented by way of example.

The industrial LAN 3 employs a proprietary network protocol based on the Ethernet standard, which differs from the network protocol (RSTP) of the office LAN 2. The bridges 5, 6, 7, 8 thus here differ from the RSTP bridges of the office LAN 2 and are hereinafter referred to as the "proprietary bridges" of the industrial LAN 3.

The office LAN 2 and the industrial LAN 3 are connected together by data technology means via two redundant data links L1, L2, where only a first redundant data link L1 represented in FIG. 1A by means of a solid line is initialized as activated for the exchange of useful data between the two networks. The second redundant data link L2, represented in FIG. 1A with a dotted line, is initialized as blocked for the exchange of useful data. The second redundant data link L2 serves solely as an activatable connection (backup-link) between the two networks 2, 3.

The first redundant data link L1 is connected with an RSTP port of the RSTP bridge 10 of the office LAN 2 and a "proprietary port" of the proprietary bridge 7 of the industrial LAN 3 using the proprietary network protocol. Both ports connected to the first data link L1 are activated, where the RSTP port of the RSTP bridge 10 of the office LAN 2 is in its "Forwarding" status.

The second redundant data link L2 is connected to an RSTP port of the RSTP bridge 11 of the office LAN 2 and a proprietary port of the proprietary bridge 8 of the industrial LAN 3. For blocking of the second redundant data link L2, the RSTP port of the RSTP bridge 11 of the office LAN 2 connected with this is transferred to its "Blocking" status, in which however only BPDUs and no useful data is accepted. The blocked RSTP port of the RSTP bridge 11 is indicated by a circled minus sign in FIG. 1A.

FIG. 1B depicts a situation, in which, based on the situation represented in FIG. 1A with an activated first redundant data link L1, the first redundant data link L1 fails. This is represented in FIG. 1B by a lighting flash. The first redundant data link L1 is additionally indicated with a dotted line. The RSTP port of the RSTP bridge 10 of the office LAN 2 connected to the first redundant data link L1 reverts to its "Blocking" status.

The failure of the first redundant data link L1 between the two networks is detected by the bridge 7 of the industrial LAN 3 connected to the first data link L1. Detection by the bridge 7 of the industrial LAN 3 takes place for example as a result of a "loss of signal" involving signals transmitted from the bridge 10 of the office LAN 2 connected to the first data link L1. This initiates a hardware-alarm in the proprietary bridge 7 of the industrial LAN 3 connected to the first redundant data link L1, following which a first data packet N1 is generated by the bridge.

The first data packet N1 is then transmitted by means of the proprietary network protocol of the industrial LAN 3 to the proprietary bridge 8 of the industrial LAN 3 connected to the second redundant data link L2 via the corresponding data link of the industrial LAN 3, as illustrated in FIG. 1B by an arrow. By means of the first data packet N1, the proprietary bridge 8 of the industrial LAN 3 is informed by the proprietary bridge 7 of the industrial LAN 3 that the activated first redundant data link L1 has failed. To this end a "failed-first-data link" flag is set in the first data packet N1 for example.

By means of reception and processing of the first data packet N1 by the proprietary bridge 8 of the industrial LAN 3 a partial or complete execution of the network protocol RSTP according to IEEE Standard 802.1w is initiated (only) on that port of the bridge 8 which is connected to the blocked second redundant data link L2. The proprietary bridge 8 of the industrial LAN 3 hereby appears to the office LAN 2 as an RSTP bridge. This is symbolically indicated in FIG. 1B by the partially overlaid representation of the proprietary bridge 8, in the nature of bridges of the office LAN 2 and in the nature of the bridges of the industrial LAN 3.

The proprietary bridge 8 of the industrial LAN 3 hereby has allocated to it a highest bridge ID, that is the lowest priority, of all RSTP bridges of the office LAN 2, by means of which it can be ensured that upon creation of a spanning tree of the office LAN 2 the proprietary bridge 8 in its property as RSTP bridge with activated RSTP port is not selected as the new root bridge in an undesired manner.

The proprietary bridge 8 of the industrial LAN 3 which is now provided with an RSTP port subsequently generates a first RSTP configuration framework (RSTP BPDU1) and transmits the first RSTP configuration framework to the RSTP bridge 11 of the office LAN 2 connected to the second redundant data link L2 via its RSTP port connected to the second redundant data link L2. This is illustrated in FIG. 1B by an arrow. Within the framework of the handshake mechanism implemented in RSTP the configuration framework RSTP BPDU1 is a proposal.

After reception and processing of the first RSTP configuration framework by the RSTP bridge 11 of the office LAN 2 the RSTP bridge 11 generates a second RSTP configuration framework (RSTP BPDU2) and transmits the second RSTP configuration framework to the proprietary bridge 8 of the industrial LAN 3. This is likewise illustrated by an arrow in FIG. 1B. The second RSTP configuration framework is a proposal for activation of the blocked RSTP ports of the bridge 11 of the office LAN 2 connected to the second redundant data link L2.

After reception and processing of the second RSTP configuration framework, the proprietary bridge 8 of the industrial LAN 3 generates a third RSTP configuration framework (RSTP BPDU3) and transmits the third RSTP configuration framework to the RSTP bridge 11 of the office LAN 2 connected to the second redundant data link L2 via its RSTP port connected to the second redundant data link L2. This is illustrated in FIG. 1B by an arrow. The third RSTP configuration framework is an agreement for activation of the blocked RSTP port of the bridge 11 of the office LAN 2 connected to the second redundant data link L2.

The blocked RSTP port of the RSTP bridge 11 of the office LAN 2 connected to the second redundant data link L2 is then thereupon transferred to its "Forwarding" status. The blocked second redundant data link L2 is hereby transferred to its active status, so that an exchange of useful data between the two networks 2, 3 via the second redundant data link L2 is enabled.

The aforementioned handshake mechanism for activation of the blocked RSTP port of the RSTP bridge 11 of the office LAN 2 connected to the second redundant data link L2 takes place by means of routines which are standardized in the IEEE Standard 802.1w.

FIG. 1C represents a further situation in which the first redundant data link L1 is restored after its failure. The proprietary bridge 7 of the industrial LAN 3 connected to the first redundant data link L1 recognizes the restored first redundant data link L1, for example via once more incoming signals, which are transmitted from the bridge 10 of the office LAN 2 connected to the first redundant data link L1.

Detection of the restored first redundant data link L1 by the proprietary bridge 7 triggers the generation of a second data packet N2 by the proprietary bridge 7. The second data packet N2 is then transmitted to the proprietary bridge 8 of the activated second redundant data link L2 using the proprietary network protocol of the industrial LAN 3 via the corresponding data link of the industrial LAN 3, as illustrated by an arrow in FIG. 1C.

By means of the second data packet N2, the proprietary bridge 8 is informed by the proprietary bridge 7 that the first redundant data link L1 is restored. For this purpose a "Failed-first-data link" flag is deleted in the second data packet N2, for example.

Through the reception and processing of the second data packet N2 by the proprietary bridge 8 of the second redundant data link L2, termination of the execution of the network protocol RSTP is initiated for the port of the proprietary bridge 8 connected to the second redundant data link L2. The port of the proprietary bridge 8 connected to the second redundant data link L2 is thus changed from an RSTP port back to a port controlled by the proprietary network protocol of the industrial LAN 3. The proprietary bridge 8 then no longer appears to the office LAN 2 as an RSTP bridge. Alternatively it is possible that on the port of the proprietary bridge 8 connected to the second redundant data link L2, only those parts of RSTP are inactivated that initiate the transmission of configuration BPDUs (hello signals).

Detection of the restored first redundant data link L1 by the proprietary bridge 7 further triggers the partial or complete execution of the network protocol RSTP according to IEEE Standard 802.1w (only) on that port of the proprietary bridge 7, which is connected to the blocked first redundant data link L1. The proprietary bridge 7 of the industrial LAN 3 hereby appears as an RSTP bridge to the office LAN 2.

The proprietary bridge 7 of the industrial LAN 3 now provided with an RSTP port thereupon generates a first RSTP configuration framework (RSTP BPDU1) and transmits the first RSTP configuration framework via its RSTP port connected to the first redundant data link L1 to the RSTP bridge 10 of the office LAN 2 connected to the first redundant data link L1. This is illustrated in FIG. 1C by an arrow. Within the framework of the handshake mechanism implemented in RSTP the configuration framework RSTP BPDU1 is a proposal.

After reception and processing of the first RSTP configuration framework by the RSTP bridge 10 of the office LAN 2 the RSTP bridge 10 generates a second RSTP configuration framework (RSTP BPDU2) and transmits the second RSTP configuration framework to the proprietary bridge 7 of the industrial LAN 3. This is likewise illustrated in FIG. 1C by an arrow. The second RSTP configuration framework is a proposal for activation of the blocked RSTP port of the bridge 10 of the office LAN 2 connected to the first redundant data link L2.

After reception and processing of the second RSTP configuration framework the proprietary bridge 7 of the industrial LAN 3 generates a third RSTP configuration framework (RSTP BPDU3) and transmits the third RSTP configuration framework to the RSTP bridge 10 of the office LAN 2 connected to the first redundant data link L1 via its RSTP port connected to the first redundant data link L1. This is illustrated in FIG. 1C by an arrow. The third RSTP configuration framework is an agreement for activation of the blocked RSTP port of the bridge 10 of the office LAN 2 connected to the first redundant data link L1.

The blocked RSTP port of the RSTP bridge 10 of the office LAN 2 connected to the first redundant data link L1 is thereupon transferred to its "Forwarding" status. The blocked first redundant data link L1 is hereby transferred to its active status, so that an exchange of useful data between the two networks 2, 3 is enabled.

The aforementioned handshake mechanism for activation of the blocked RSTP port of the RSTP bridge 10 of the office LAN 2 connected to the first redundant data link L1 takes place by means of routines which are standardized in the IEEE Standard 802.1w.

The second RSTP configuration framework (RSTP BPDU2) received from proprietary bridge 7 of the industrial LAN 3 is further forwarded unchanged to the proprietary bridge 8 connected to the second redundant data link L2. Forwarding here takes place by means of the proprietary network protocol of the industrial LAN 3. After reception, the proprietary bridge 8 connected to the second redundant data link L2 forwards the second RSTP configuration framework (RSTP BPDU2) unchanged to the RSTP bridge 11 of the office LAN 2 connected to the second redundant data link L2. The RSTP port of the RSTP bridge 11 of the office LAN 2 connected to the second redundant data link L2 currently in the "Forwarding" status is thereupon transferred to its "Blocking" status, so that the second redundant data link L2 is inactivated.

Subsequently, after activation of the first redundant data link L1 and after forwarding of the second RSTP configuration framework (RSTP BPDU2) by the proprietary bridge 7 of the industrial LAN 3, termination of the execution of the network protocol RSTP for the port of the proprietary bridge 7 connected to the first redundant data link L1 is initiated. The port of the proprietary bridge 7 connected to the first redundant data link L1 is thus changed from an RSTP port back to a port controlled by the proprietary network protocol of the industrial LAN 3. The proprietary bridge 7 then no longer appears to the office LAN 2 as an RSTP bridge.

The invention claimed is:

1. A method of reconfiguring a packet-switched communications network, comprising:
    providing a first network using a first network protocol;
    providing a second network using a second network protocol differing from the first network protocol;
    providing a first and second redundant data links, wherein only one data link is activated for a data exchange, wherein the first redundant data link is initialized as active and the second redundant data link is initialized as inactive;
    detecting a failure of the first redundant data link by a first bridge of the second network, the first bridge being connected to the first redundant data link;
    generating a first data packet by the first bridge;
    transmitting the first data packet by the first bridge to a second bridge of the second network, the second bridge being connected to the second redundant data link;
    receiving the first data packet by the second bridge; and
    processing the first data packet by the second bridge,
    wherein the first data packet contains logical information which initiates
        at least partial execution of the first network protocol on a port of the second bridge and
        activation of the second redundant data link by the first network protocol, wherein the method, further comprises:
    detecting a restoration of the failed first redundant data link by the first bridge;
    generating a second data packet by the first bridge;
    transmitting the second data packet by the first bridge to the second bridge of the second network;
    receiving the second data packet by the second bridge;
    processing the second data packet by the second bridge,
        wherein the second data packet contains logical information which initiates
        an at least partial termination of the execution of the first network protocol on the port of the second bridge or
        a termination of the transmission of configuration frameworks via the second redundant data link;
    activating the first redundant data link; and
    inactivating the second redundant data links.

2. The method as claimed in claim 1, wherein the detecting of the failure of the first redundant data link by the first bridge connected to the first redundant data link takes place based upon a signal from a bridge of the first network connected to the first data link no longer being received by the first bridge of the second network.

3. The method as claimed in claim 1, wherein the first network protocol is RSTP (Rapid Spanning Tree Protocol) according to IEEE Standard 802.1w.

4. The method as claimed in claim 3, wherein the activation of the second redundant data link takes place based upon an execution of a handshake mechanism implemented in RSTP between the bridges directly connected to the second redundant data link.

5. The method as claimed in claim 1, wherein the first data packet is transmitted by the second network protocol from the first bridge of the second network to the second bridge of the second network.

6. The method as claimed in claim 1, wherein after the detecting the restoration of the failed first redundant data link an at least partial execution of the first network protocol takes place on a port of the first bridge connected to the first redundant data link.

7. The method as claimed in claim 6, wherein the activating of the first redundant data link takes place by executing a handshake mechanism implemented in RSTP between the bridges directly connected to the first redundant data link.

8. The method as claimed in claim 7, wherein for the inactivating of the second redundant data links a configuration framework generated during the handshake mechanism is forwarded to a bridge of the first network connected to the second redundant data link by the first bridge.

9. The method as claimed in claim 6, wherein after activating the first redundant data link, an at least partial termination of the execution of the first network protocol takes place on the port of the first bridge connected to the first redundant data link.

10. A packet-switched communications network, comprising:
    a first network including a first network protocol;

a second network including a second network protocol differing from the first network protocol;
a first redundant data link being initialized as activated;
a second redundant data link being initialized as inactivated, the two networks being connected by the two redundant data links, only one data link being activated for a data exchange; and
bridges, wherein the bridges are configured to execute a method for reconfiguring a packet-switched communications network, the method comprising:
detecting a failure of the first redundant data link by a first bridge of the second network, the first bridge being connected to the first redundant data link;
generating a first data packet by the first bridge;
transmitting the first data packet by the first bridge to a second bridge of the second network, the second bridge being connected to the second redundant data link;
receiving the first data packet by the second bridge; and
processing the first data packet by the second bridge, wherein the first data packet contains logical information which initiates
at least partial execution of the first network protocol on a port of the second bridge and
activation of the second redundant data link by the first network protocol, wherein the method further comprises:
detecting a restoration of the failed first redundant data link by the first bridge;
generating a second data packet by the first bridge;
transmitting the second data packet by the first bridge to the second bridge of the second network:
receiving the second data packet by the second bridge;
processing the second data packet by the second bridge, wherein the second data packet contains logical information which initiates
an at least partial termination of the execution of the first network protocol on the port of the second bridge or
a termination of the transmission of configuration frameworks via the second redundant data link;
activating the first redundant data link; and
inactivating the second redundant data links, 11. The packet-switched communications network as claimed in claim 10, wherein the detecting of the failure of the first redundant data link by the first bridge connected to the first redundant data link takes place based upon a signal from a bridge of the first network connected to the first data link no longer being received by the first bridge of the second network.

12. The packet-switched communications network as claimed in claim 10, wherein the first network protocol is RSTP (Rapid Spanning Tree Protocol) according to IEEE Standard 802.1w.

13. The packet-switched communications network as claimed in claim 12, wherein the activation of the second redundant data link takes place based upon an execution of a handshake mechanism implemented in RSTP between the bridges directly connected to the second redundant data link.

14. The packet-switched communications network as claimed in claim 10, wherein the first data packet is transmitted by the second network protocol from the first bridge of the second network to the second bridge of the second network.

15. The packet-switched communications network as claimed in claim 10, wherein after the detecting the restoration of the failed first redundant data link an at least partial execution of the first network protocol takes place on a port of the first bridge connected to the first redundant data link.

16. The packet-switched communications network as claimed in claim 15, wherein the activating of the first redundant data link takes place by executing a handshake mechanism implemented in RSTP between the bridges directly connected to the first redundant data link.

17. The packet-switched communications network as claimed in claim 16, wherein for the inactivating of the second redundant data links a configuration framework generated during the handshake mechanism is forwarded to a bridge of the first network connected to the second redundant data link by the first bridge.

18. A bridge of a packet-switched communications network, the bridge being configured to execute a method for reconfiguring a packet-switched communications network, the method comprising:
providing a first network using a first network protocol;
providing a second network using a second network protocol differing from the first network protocol;
providing a first and second redundant data links, wherein only one data link is activated for a data exchange, wherein the first redundant data link is initialized as active and the second redundant data link is initialized as inactive;
detecting a failure of the first redundant data link by a first bridge of the second network, the first bridge being connected to the first redundant data link;
generating a first data packet by the first bridge;
transmitting the first data packet by the first bridge to a second bridge of the second network, the second bridge being connected to the second redundant data link;
receiving the first data packet by the second bridge; and
processing the first data packet by the second bridge, wherein the first data packet contains logical information which initiates
at least partial execution of the first network protocol on a port of the second bridge and
activation of the second redundant data link by the first network protocol, wherein the method further comprises:
detecting a restoration of the failed first redundant data link by the first bridge;
generating a second data packet by the first bridge;
transmitting the second data packet by the first bridge to the second bridge of the second network;
receiving the second data packet by the second bridge;
processing the second data packet by the second bridge, wherein the second data packet contain logical information which initiates
an at least partial termination of the execution of the first network protocol on the port of the second bridge or
a termination of the transmission of configuration frameworks via the second redundant data link;
activating the first redundant data link; and
inactivating the second redundant data links.

* * * * *